(12) United States Patent
Girard

(10) Patent No.: US 6,654,890 B1
(45) Date of Patent: Nov. 25, 2003

(54) PROTECTION OF LAPTOP COMPUTERS FROM THEFT IN THE STREAM OF COMMERCE

(75) Inventor: Luke E. Girard, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/410,854

(22) Filed: Oct. 1, 1999

(51) Int. Cl.[7] .................................................. H04L 9/00
(52) U.S. Cl. ...................... 713/200; 713/201; 713/193; 713/194
(58) Field of Search ................................. 713/182, 189, 713/193, 194, 200, 201

(56) References Cited

U.S. PATENT DOCUMENTS 5,276,735 A * 1/1994 Boebert et al. ............. 713/167
5,675,321 A * 10/1997 McBride ................... 340/568.2

* cited by examiner

Primary Examiner—Thomas R. Peeso
(74) Attorney, Agent, or Firm—Blakely, Sokoloff, Taylor & Zafman LLP

(57) ABSTRACT

The present invention relates to wirelessly locking a computer platform to discourage theft as the platform is transported in a distribution channel. A computer platform having a chipset, a random access memory (RAM) coupled to the chipset, a central processing unit coupled to the chipset, a protected storage device in communication with the chipset, and a wireless communication device coupled to the chipset is presented. A radio signal having an authentication lock is introduced into the wireless communication device. The authentication lock is then placed in the protected storage device. The computer platform is placed in the distribution channel.

16 Claims, 3 Drawing Sheets

PROTECTION OF LAPTOP COMPUTERS FROM THEFT IN THE STREAM OF COMMERCE

BACKGROUND OF THE INVENTION

1. Field of the Invention

The invention relates to protecting mobile platforms from theft as the mobile platforms are transported between the manufacturer and a customer.

2. Background Information

A laptop computer may be viewed as a portable personal computer of a size suitable to rest comfortably on one's legs. A laptop is smaller than a "luggable" computer (portable, but not comfortably) but bigger than a "palmtop" computer (easily carried in one hand or a shirt pocket). As a mobile platform, laptops have experienced exponential popularity ever since Toshiba introduced the first laptop in 1989.

Along with the rise in laptop popularity has been an increase in laptop theft. This increase in theft has reached the point where theft is the number one problem facing mobile computer users. In 1996, 265,000 laptops were stolen in the United States. And in 1997, 309,000 laptops were stolen. This trend is made particularly acute in a 1999 news article published by the Los Angeles Times, where the headline asserted, "Hot Trend in Computers: Laptop Theft Going Up as Fast as Chip Speeds." L.A. Times, Business at C7, Apr. 11, 1999.

A significant part of the laptop theft problem occurs while the laptop is transported in the distribution channel between the laptop manufacturer and the consumer. Thieves have taken laptops off loading docks and in large volumes by hijacking trucks and trains transporting laptops. In an even more disturbing trend, thieves have been targeting laptop customers as they leave a store with their new laptop as reported in "Laptops are Target of Quick Robberies," Sun-Sentinel (Ft. Lauderdale, Fla.), Aug. 21, 1999.

A variety of devices and services are available to prevent channel theft of laptops. Alarm systems may be added to a laptop. Some alarm systems include motion sensors that sound when the laptop case is moved; others are designed to go off when the laptop is removed from the laptop case. Most laptops today include an aperture through which a security cable may be inserted. In addition, theft tracking services are available to laptop owners. For example, if a laptop is stolen and at some later time connected to a phone line, the laptop computer employs the security software installed by the tracking service to secretly call the tracking service and report the location of the laptop.

The problem with the above types of laptop protection devices is that they are only directed at laptop theft from a user (user theft). None of them protect the laptop from theft or discourage theft as the laptop is transported in the stream of commerce between the laptop manufacturer and the consumer. In particular to the phone home software subscription service, the laptop unit first needs to be powered up so that subscription credentials can be manually installed. At the manufacturing or shipping stage of a laptop, this manual installation of software is a time consuming task. Moreover, this would not discourage thieves as they could use the laptop without ever connecting the laptop to a phone system.

Computer system designers have thus turned to preboot authorization through password protection. Preboot authorization may be viewed as authorization requested by a platform prior to the system booting up. A password is an arbitrary string of characters chosen by a user in order to prevent unauthorized access to a computer platform. To achieve this, a password is used to authenticate the user when that user attempts to boot or log onto the system.

A problem with password protection is that, by themselves, they are insufficient. First, they are only directed at user theft, not theft as the laptop travels in the stream of commerce. Moreover, passwords can be determined through strategic guesses or they can be cracked or hacked. A favorite activity among crackers is writing programs that attempt to discover passwords by using lists of commonly chosen passwords such as people's names (spelled forwards or backwards). Moreover, by removing the battery powering the complementary metal oxide semiconductor (CMOS) of most platforms, the password is erased so that the platform becomes accessible. A web site dedicated to describing techniques of bypassing the basic input/output system (BIOS) password of mobile platforms may be found at <http://pimall.com/nais/ n.pass.html> or <http://www.goodnet.com/~jeriii/info/pchack.htm>.

Thus, what is needed is theft protection for a laptop as the laptop is transported in the stream of commerce from the laptop manufacturer through retailers to the consumer.

SUMMARY OF THE INVENTION

The present invention relates to wirelessly locking a computer platform to discourage theft as the platform is transported in a distribution channel. A computer platform having a chipset, a random access memory (RAM) coupled to the chipset, a central processing unit coupled to the chipset, a protected storage device in communication with the chipset, and a wireless communication device coupled to the chipset is presented. A radio signal having an authentication lock is introduced into the wireless communication device. The authentication lock is then placed in the protected storage device. The computer platform is placed in the distribution channel.

DETAILED DESCRIPTION OF THE INVENTION

Figure 1:
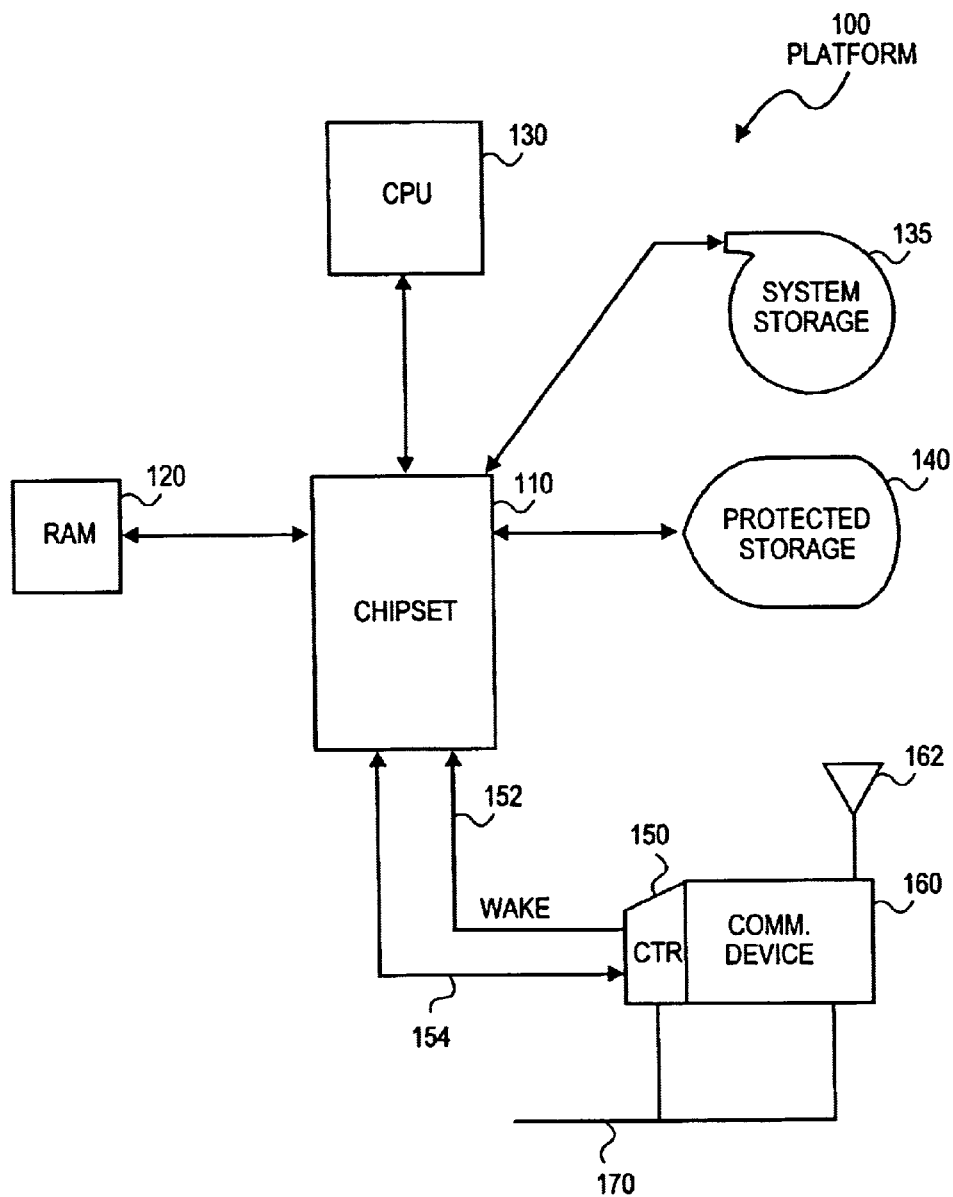
FIG. 1 is a block diagram of platform 100 of the invention.

FIG. 1 is a block diagram of platform 100 of the invention. Preferably, platform 100 resides on a mobile computer such as a laptop. Platform 100 includes chipset 110. Chipset 110 provides interface capability from a processor to peripherals, memory, buses, and the like. Chipset 110 may be any collection of one or more integrated circuits that are designed to be used together for some specific purpose, such as control circuitry in a personal computer.

Coupled to chipset 110 may be random access memory (RAM) 120, central processing unit (CPU) 130, and system non-volatile storage 135. RAM 120 may be any data storage device for which the order of access to different locations does not affect the speed of access, including any device that can hold data in machine-readable format. CPU 130 may be viewed as that part of platform 100 which controls all the other parts by executing software that may be residing in platform 100. System non-volatile storage 135 may contain a basic input/output system (BIOS) and other pre-boot code.

In conventional personal computer platforms, the platform is designed to be an open, general purpose platform. However, there is no location within such a platform on which to store data so that data remains protected by its location within the platform. Software applications inevitably may be written so as to be able to view all data within an open, general purpose platform.

To account for this, an embodiment of the invention includes protected storage 140. Protected storage 140 permits data to be directed into protected storage 140 through an application dedicated specifically for that purpose. Preferably, the application is consumer specific in that each copy of the protected storage application is made unique through an authentication lock and key system. Protected storage is not accessible to other applications such as those residing in RAM 120, even though these applications may be able to determine the presence of protected storage 140.

Preferably, protected storage 140 is coupled to chipset 110. However, protected storage may reside within chipset 110 or within wireless communication device 160 as discussed below.

Preferably, protected storage 140 is a non-volatile storage that may be part of system non-volatile storage 135. Non-volatile storage devices include any storage device whose contents are preserved when its power is off. Storage using magnetic media (e.g. magnetic disks, magnetic tape or bubble memory) is normally non-volatile by nature whereas semiconductor memories (static RAM and especially dynamic RAM) are normally volatile. However, semiconductor memories can be made into non-volatile storage by having a (rechargeable) battery permanently connected. Another example of a non-volatile storage is an electrically erasable programmable read only memory (EEPROM).

As shown in FIG. 1, wireless communication device 160 may be coupled to chipset 110 through embedded controller 150. Extending from controller 150 to chipset 110 may be wake event dedicated line 152 and data line 154. Wireless communication device 160 includes receiver/transmitter 162. Resume power supply lines 170 are directed into controller 150 and wireless communication device 160 so as to distribute low power within platform 100.

Wireless communication device 160 may be a radio module that provides wireless capabilities. In a preferred embodiment, wireless communication device 160 employs Bluetooth technology. Bluetooth technology is an open specification for wireless communication of data and voice that operates in the unlicensed Industrial, Scientific, Medical (ISM) band at 2.4 GigaHertz (GHz). The gross data rate may be 1 megabit per second (Mb/s).

As a radio module that provides wireless capabilities, Bluetooth technology is based on a low-cost short-range radio link, built into a 9×9 millimeter (mm) microchip, facilitating protected ad hoc connections for stationary and mobile communication environments. A frequency hop transceiver is applied to combat interference and fading.

Bluetooth technology allows for the replacement of the many proprietary cables that connect one device to another with one universal short-range radio link. For instance, Bluetooth radio technology built into both the cellular telephone and the laptop would replace the cumbersome cable used today to connect a laptop to a cellular telephone. Printers, desktops, fax machines, keyboards, joysticks and virtually any other digital input or output device can be part of the Bluetooth system.

Beyond untethering devices by replacing the cables, Bluetooth radio technology provides a universal bridge to existing data networks, a peripheral interface, and a mechanism to form small private ad hoc groupings of connected devices away from fixed network infrastructures. Designed to operate in a noisy radio frequency environment, the Bluetooth radio uses a fast acknowledgement and frequency hopping scheme to make the link robust. The frequency hopping scheme may involve eighty channels where one channel is engaged every six milliseconds. The frequency hopping may be bi-directional.

The Bluetooth baseband provides user protection and information privacy mechanisms at the physical layer. Authentication and encryption may be implemented in the same way in each Bluetooth device, appropriate for the ad hoc nature of the network. Connections may require a one-way, two-way, or no authentication. Authentication is based on a challenge-response algorithm. Authentication is a key component of any Bluetooth system, allowing the user to develop a domain of trust between a personal Bluetooth device, such as allowing only the owner's notebook computer to communicate through the owner's cellular telephone. Encryption is used to protect the privacy of the connection.

Figure 2A:
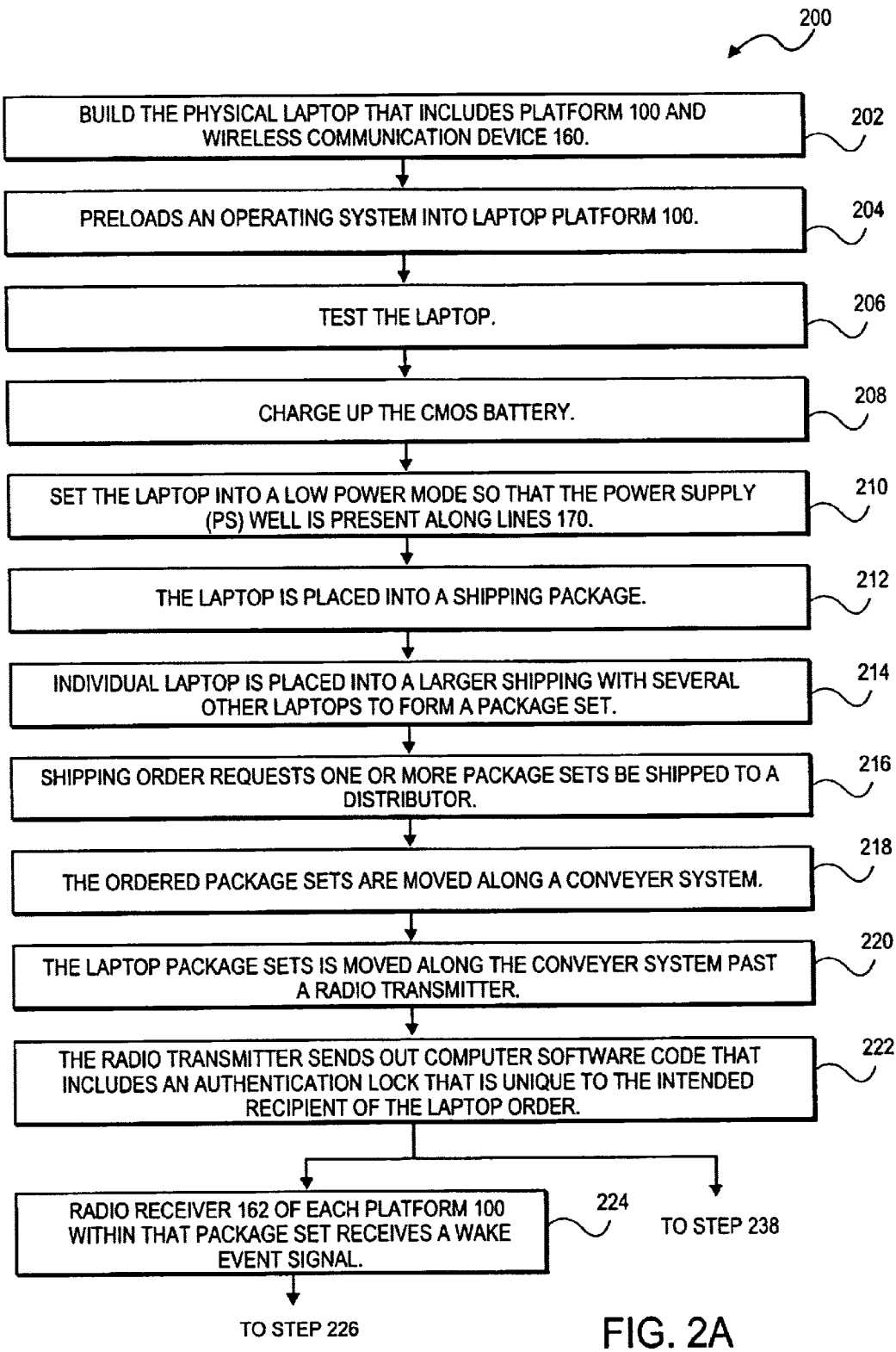
FIG. 2A is a block flow diagram of method 200 of the invention prior to platform 100 registering the wake event.

FIG. 2A is a block flow diagram of method 200 of the invention prior to platform 100 registering the wake event. In step 202 of FIG. 2, the manufacturer builds the physical laptop that includes platform 100 and wireless communication device 160. Preferably wireless communication device 160 employs Bluetooth technology. At this point, the laptop is ready to receive software. At step 204, the manufacturer preloads an operating system into laptop platform 100. At step 206, the manufacturer tests the laptop. As step 208, the manufacturer charges up the main battery and the CMOS battery.

At step 210, the manufacturer sets the laptop into a low power mode so that the power supply (PS) well is present along lines 170. A low power mode or power saver mode is a feature of a component or subsystem designed to actively reduce its power consumption when not in use. The most common application for a power saver mode is for portable computers that attempt to conserve battery life by incorporating power saving modes in the CPU, display, disks, printer, or other units.

With the laptop tested, charged, and in suspend, the laptop is placed into a shipping package at step 212. At step 214, that individual laptop is placed into a larger shipping with several other laptops to form a package set. With each laptop in low power mode, each main battery and CMOS battery maintains its charge prior to shipping and during warehouse storage. Warehouse storage may last anywhere from one day to several months or even years. The distribution channel may include warehouse storage.

At step 216, a shipping order requests that one or more package sets be shipped to a distributor. Conventionally, laptops are shipped in large quantities from the warehouse of a manufacturer to a central distributor (in the thousands), to local distributors, and to retailers. To handle large shipping orders for laptops at the warehouse of the manufacturer, the laptops are moved within the warehouse on a conveyer system such as conveyer belts. Thus, at step 218, the ordered package sets are moved along a conveyer system. At step 220, the laptop package sets are moved along the conveyer system past a radio transmitter.

At step 222, the radio transmitter sends out computer software code that includes an authentication lock that is unique to the intended recipient of the laptop order. Preferably, the authentication lock is a pre-boot authentication lock that strengthens the pre-boot user authentication capability of a mobile computer such as a laptop. Moreover, the authentication lock preferably includes signed credential code that only the intended laptop recipient could unlock. For example, if the ordered laptop packages sets were to be sent to Fry's Electronics, the authentication lock would be unique to Fry's Electronics and no one else could unlock the authentication lock. Alternatively, the authentication key may be radioed to the laptop as the laptop is stationary oh the shelving of the warehouse. At step 224, radio receiver 162 of each platform 100 within that package set receives a wake event signal and method 200 proceeds to step 226.

Figure 2B:
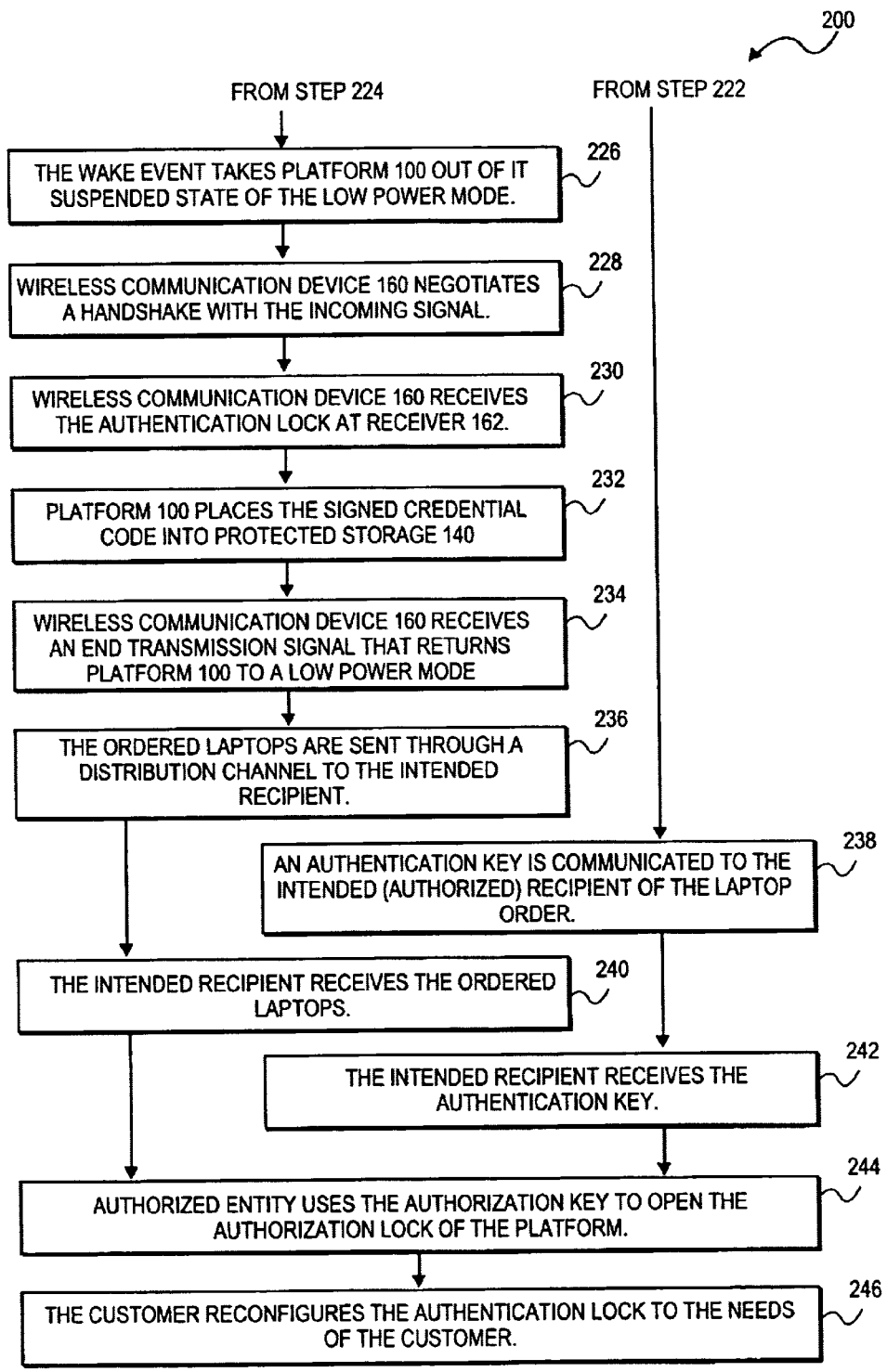
FIG. 2B is a block flow diagram of method 200 of the invention after platform 100 registering the wake event.

FIG. 2B is a block flow diagram of method 200 of the invention after platform 100 registers the wake event. At step 226, the wake event takes platform 100 out of its suspended state in the low power mode. This may be done by activating wireless communication device 160 to send a wake event along line 152 of FIG. 1 to chipset 110. Preferably, a Bluetooth subsystem employs the code of the authentication lock to take the laptop out of its suspended state.

At step 228, wireless communication device 160 negotiates a handshake with the incoming signal. The handshake preferably is bi-directional and includes frequency hopping. At step 230, wireless communication device 160 receives the authentication lock at receiver 162. Method 200 then proceeds to step 232. At step 232, platform 100 places the signed credential code into protected storage 140.

The benefit of using a wireless communication device to. receive an authentication lock is that the authentication lock may be received by the platform without having to spend man hours handling the platform. Moreover, the authentication lock may be transmitted to the wireless receiver even though the platform is within one or several shipping packages. Thus, existing handling methods need not be changed or modified. This is especially true if the authentication lock is placed onto the platform as the platform is transported along a conveyer system within the warehouse of the manufacturer.

As noted above, protected storage 140 may be viewed as storage in a platform that is not observable or modifiable by anyone except an authorized entity. An example of an authorized entity is the intended recipient of the laptop order who has the unique application that was used to place the authorization lock into protected storage 140. Preferably, the Bluetooth subsystem employs its own code to direct the signed credentials into the protected storage of the platform. This can also be achieved by pre-boot authentication code the system non-volatile storage 135 (which preferably is different from protected storage 140) with its own code to access protected storage.

With the signed credentials (authentication lock) stored in protected storage, wireless communication device 160 receives an end transmission signal that returns platform 100 to a low power mode at step 234. Resume power supply lines 170 distribute low power within platform 100 in this low power mode. Step 234 may occur before or within the distribution channel. Preferably, step 234 occurs prior to the laptop leaving the control of the manufacturer.

At step 236, the ordered laptops are sent through a distribution channel to the intended recipient. The distribution channel may include transportation of the laptops by walking, by car, by truck, by train, by airplane, by boat, and by other transportation devices.

Parallel with step 224, an authentication key is communicated at step 238 to the intended (authorized) recipient of the laptop order. Step 238 preferably is performed over protected communication channels that are separate from the transportation channels used in step 236. Preferably, the authentication key is sufficient to unlock the authentication lock placed into each laptop by wireless communication. For example, the authentication key may include the signed credentials stored in protected storage 140 within the laptop during step 232.

The communication channel of step 238 may be separate from the transportation channel of step 236 by at least space or time. The communication channel may be by mail, Internet, phone, surface streets, or other channels. The authentication key may be placed on a floppy disk and mailed to the intended recipient.

At step 240, the intended recipient receives the ordered laptops. At step 242, the intended recipient receives the authentication key. Step 240 and step 242 may occur in any order. At step 244, an authorized entity uses the authorization key to open the authorization lock of the platform. Steps 240 through 244 may be achieved by the retailer selling a laptop to a customer and mailing a floppy disk on which resides the authentication key to the customer. In a protected area such as the home of the customer, the customer may insert the floppy disk into the laptop and turn on the power switch. At this point the authentication key opens the authorization lock of the platform either directly or after a personal identification number (PIN) is entered. Preferably, steps 240 through 244 occur prior to the operating system booting up. At step 246, the customer reconfigures the authentication lock to the needs of the customer.

The exemplary embodiments described herein are provided merely to illustrate the principles of the invention and should not be construed as limiting the scope of the subject matter of the terms of the claimed invention. For example, the authentication lock/key combination may be public key/private key based or shared secret base. The principles of the invention may be applied toward a wide range of systems to achieve the advantages described herein and to achieve other advantages or to satisfy other objectives, as well.

What is claimed is:

1. In a personal computer, a mobile platform, comprising:
    a chipset;
    a random access memory (RAM) coupled to the chipset;
    a central processing unit coupled to the chipset;
    a protected storage device in communication with the chipset; and
    a wireless communication device coupled to the chipset, the wireless communication device employs an open specification for wireless communication for data and voice.

2. The mobile platform of claim 1, wherein the protected storage is disposed within one of the chipset and the wireless communication device.

3. The mobile platform of claim 1, wherein the protected storage is coupled to the chipset.

4. The mobile platform of claim 1, wherein the wireless communication device operates at 2.4 GigaHertz.

5. The mobile platform of claim 4, wherein the wireless communication device includes frequency hopping every six milliseconds where the frequency hopping is bi-directional.

6. The mobile platform of claim 5, wherein the frequency hopping every occurs every six milliseconds and wherein the frequency hopping is bi-directional, the mobile platform further comprising:

a system non-volatile storage coupled to the chipset.

7. A method comprising:

transmitting a radio signal having an authentication lock into a wireless communication device of a computer platform having a chipset, a random access memory (RAM) coupled to the chipset, a central processing unit coupled to the chipset, a protected storage device in communication with the chipset, and the wireless communication device coupled to the chipset;

storing the authentication lock in the protected storage device; and placing the computer platform in the distribution channel.

8. The method of claim 7, subsequent to placing the computer platform in the distribution channel, the method further comprising:

sending an authentication key to a predetermined destination; and receiving the computer platform and the authentication key at a predetermined destination.

9. The method of claim 8, wherein transmitting a radio signal into the wireless communication device includes transmitting a wake event into the computer platform.

10. The method of claim 9, subsequent to transmitting a wake event into the computer platform, the method further comprising:

negotiating a handshake between the wireless communication device and the incoming radio signal.

11. The method of claim 10, prior to transmitting a radio signal into the wireless communication device, the method further comprising:

passing the computer platform in front of a radio signal transmitter.

12. A method comprising:

transmitting a radio signal having an authentication lock into a wireless communication device of a computer platform having a chipset, a random access memory (RAM) coupled to the chipset, a central processing unit coupled to the chipset, a protected storage device in communication with the chipset, and the wireless communication device coupled to the chipset;

storing the authentication lock in the protected storage device; and placing the laptop in the distribution channel.

13. The method of claim 12, subsequent to placing the laptop in the distribution channel, the method further comprising:

sending an authentication key to a predetermined destination; and receiving the laptop and the authentication key at a predetermined destination.

14. The method of claim 13, wherein transmitting a radio signal into the wireless communication device includes introducing a wake event into the laptop.

15. The method of claim 14, subsequent to tranmitting a wake event into the laptop, the method further comprising:

negotiating a handshake between the wireless communication device and the incoming radio signal.

16. The method of claim 15, prior to transmitting a radio signal into the wireless communication device, the method further comprising:

passing the laptop in front of a radio signal transmitter.

* * * * *

UNITED STATES PATENT AND TRADEMARK OFFICE
CERTIFICATE OF CORRECTION

PATENT NO. : 6,654,890 B1
DATED : November 25, 2003
INVENTOR(S) : Girard

It is certified that error appears in the above-identified patent and that said Letters Patent is hereby corrected as shown below:

Column 5,
Line 11, delete "oh" and insert -- on --.

Column 8,
Line 24, delete "tranmitting" and insert -- transmitting --.

Signed and Sealed this

Thirty-first Day of August, 2004

JON W. DUDAS
*Director of the United States Patent and Trademark Office*